(12) United States Patent
Taguchi et al.

(10) Patent No.: US 9,662,700 B2
(45) Date of Patent: May 30, 2017

(54) DEVICE AND METHOD FOR FORMING THIN PLATE-SHAPED SUBSTRATE

(71) Applicant: Nissan Motor Co., Ltd., Yokohama-shi, Kanagawa (JP)

(72) Inventors: Naoto Taguchi, Kanagawa (JP); Masaaki Yoshitome, Kanagawa (JP); Manabu Higuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 14/892,215

(22) PCT Filed: May 26, 2014

(86) PCT No.: PCT/JP2014/063872
§ 371 (c)(1),
(2) Date: Nov. 19, 2015

(87) PCT Pub. No.: WO2014/208244
PCT Pub. Date: Dec. 31, 2014

(65) Prior Publication Data
US 2016/0129491 A1 May 12, 2016

(30) Foreign Application Priority Data

Jun. 25, 2013 (JP) ................................. 2013-133062

(51) Int. Cl.
*B21D 53/04* (2006.01)
*B21D 25/02* (2006.01)
(Continued)

(52) U.S. Cl.
CPC ............ *B21D 25/02* (2013.01); *B21D 13/02* (2013.01); *B21J 13/14* (2013.01); *H01M 8/0202* (2013.01); *H01M 8/0206* (2013.01)

(58) Field of Classification Search
CPC ..... B21D 13/02; B21D 25/02; H01M 8/0202; H01M 8/0206; B21J 13/14
(Continued)

(56) References Cited

U.S. PATENT DOCUMENTS 3,340,719 A * 9/1967 Kandle .................. B21D 13/02
72/384
4,077,247 A * 3/1978 Stewart .................. B21D 13/10
29/896.6

(Continued)

FOREIGN PATENT DOCUMENTS

DE 102010052738 A1 5/2012
JP 1979-84335 U 6/1979
(Continued)

*Primary Examiner* — David B Jones
(74) *Attorney, Agent, or Firm* — Global IP Counselors, LLP

(57) ABSTRACT

A thin plate-shaped substrate molding device for pressing molding a pre-molded article to a prescribed irregular shape. The thin plate-shaped substrate molding device comprises a first die, a second die, a plurality of tensioning portions and a controller. The first and second dies are movably disposed to be moved towards and away from each other. The second die has protruding portions that protrude towards the first die for forming stretched portions and forming bent portions. The controller controls the first die, the second die and the tensioning portions. The bent portions are tensioned and stretched by the tensioning portions, while the stretched portions of the pre-molded article are still pressed by the first die and the protruding portions of the second die, to impart the shape of the protruding portions to the pre-molded article along the side edges of the protruding portions.

12 Claims, 12 Drawing Sheets

(51) Int. Cl.
*B21J 13/14* (2006.01)
*B21D 13/02* (2006.01)
*H01M 8/0202* (2016.01)
*H01M 8/0206* (2016.01)

(58) Field of Classification Search
USPC .................................. 72/326, 379.6, 385
See application file for complete search history.

(56) References Cited

U.S. PATENT DOCUMENTS

| 6,502,447 B2 * | 1/2003 | Adams | B21D 13/02 |
| | | | 72/326 |
| 6,557,389 B1 * | 5/2003 | Listak | B21D 13/02 |
| | | | 72/385 |

FOREIGN PATENT DOCUMENTS

| JP | 9-276960 A | 10/1997 |
| JP | 2001-259752 A | 9/2001 |
| JP | 2005-56820 A | 3/2005 |

\* cited by examiner

DEVICE AND METHOD FOR FORMING THIN PLATE-SHAPED SUBSTRATE

CROSS-REFERENCE TO RELATED APPLICATIONS

This application is a U.S. National stage application of International Application No. PCT/JP2014/063872, filed May 26, 2014, which claims priority to Japanese Patent Application No. 2013-133062 filed in Japan on Jun. 25, 2013.

BACKGROUND

Field of the Invention

The present invention relates to a molding device and a method for molding a thin plate-shaped substrate.

Background Information

A metal separator for use in a fuel cell can be shown by way of an example of a thin-sheet member obtained by forming a thin plate-shaped substrate to a prescribed irregular shape (see for example Japanese Laid-Open Patent Application No. 2005-56820). A metal separator is formed by press molding using a press machine and dies. By superimposing two metal separators, channels for the flow of a fuel gas, an oxidant gas, and cooling water (coolant), respectively, are formed.

SUMMARY

Ordinarily, a metal separator for a fuel cell is formed by press molding of a substrate that is long and relatively thin, and therefore wrinkling and other such distortions are prone to occur. In a metal separator in which distortions remain, it becomes impossible to form channels having the designed channel cross-sectional shape.

The present invention was made in order to solve the aforementioned problem encountered with the prior art, and has as an object to provide a molding device and a method for molding a thin plate-shaped substrate, with which it is possible to mold a thin plate-shaped substrate without residual distortion.

The thin plate-shaped substrate molding device according to the present invention for achieving the above objective is employed for press molding a pre-molded article obtained by pre-molding a thin plate-shaped substrate to a prescribed irregular shape. The device for molding a thin plate-shaped substrate has a first die, a second die, protruding portions, tensioning portions, and a controller. The first die and the second die are disposed so as to be capable of moving towards and away from each other. The protruding portions are disposed on the second die so as to protrude towards the first die, and are provided with leading edges for forming stretched portions stretched by localized pressing of the pre-molded article, and side edges for inducing deflection of sections that are continuous with the stretched portions, and forming bent portions in spaces bounded on one side by the first die. The tensioning portions tension and stretch the bent portions. The controller controls the operation of the first die, the second die, and the tensioning portions The bent portions are tensioned and stretched by the tensioning portions while the stretched portions of the pre-molded article are still pressed by the first die and the protruding portions of the second die, imparting the shape of the protruding portions to the pre-molded article along the side edges of the protruding portions. The prescribed irregular shape of the pre-molded article is an irregular shape such that bent portions will be formed.

With the thin plate-shaped substrate molding method according to the present invention for achieving the above objective, a pre-molded article obtained by pre-molding a thin plate-shaped substrate to a prescribed irregular shape is press-molded by a first die and a second die disposed so as to be capable of moving towards and away from each other. The thin plate-shaped substrate molding method has a deflection forming step and a tensioning step. In the deflection forming step, stretched portions which are stretched by localized pressing of the pre-molded article by the first die and the leading edges of protruding portions disposed on the second die and protruding towards the first die are formed, and deflection is induced in sections that are continuous with the stretched portion, forming bent portions in spaces formed between the first die and the protruding portions of the second die. In the tensioning step, the bent portions are tensioned and stretched while the stretched portions of the pre-molded article are still pressed by the first die and the protruding portions of the second die, imparting the shape of the protruding portions to the pre-molded article along side edges which are continuous with the leading edges of the protruding portions, imparting the shape of the protruding portions to the pre-molded article. The prescribed irregular shape of the pre-molded article is an irregular shape such that the bent portions will be formed in the deflection forming step.

BRIEF DESCRIPTION OF THE DRAWINGS

Referring now to the attached drawings which form a part of this original disclosure.

DETAILED DESCRIPTION OF THE EMBODIMENTS

Figure 1:
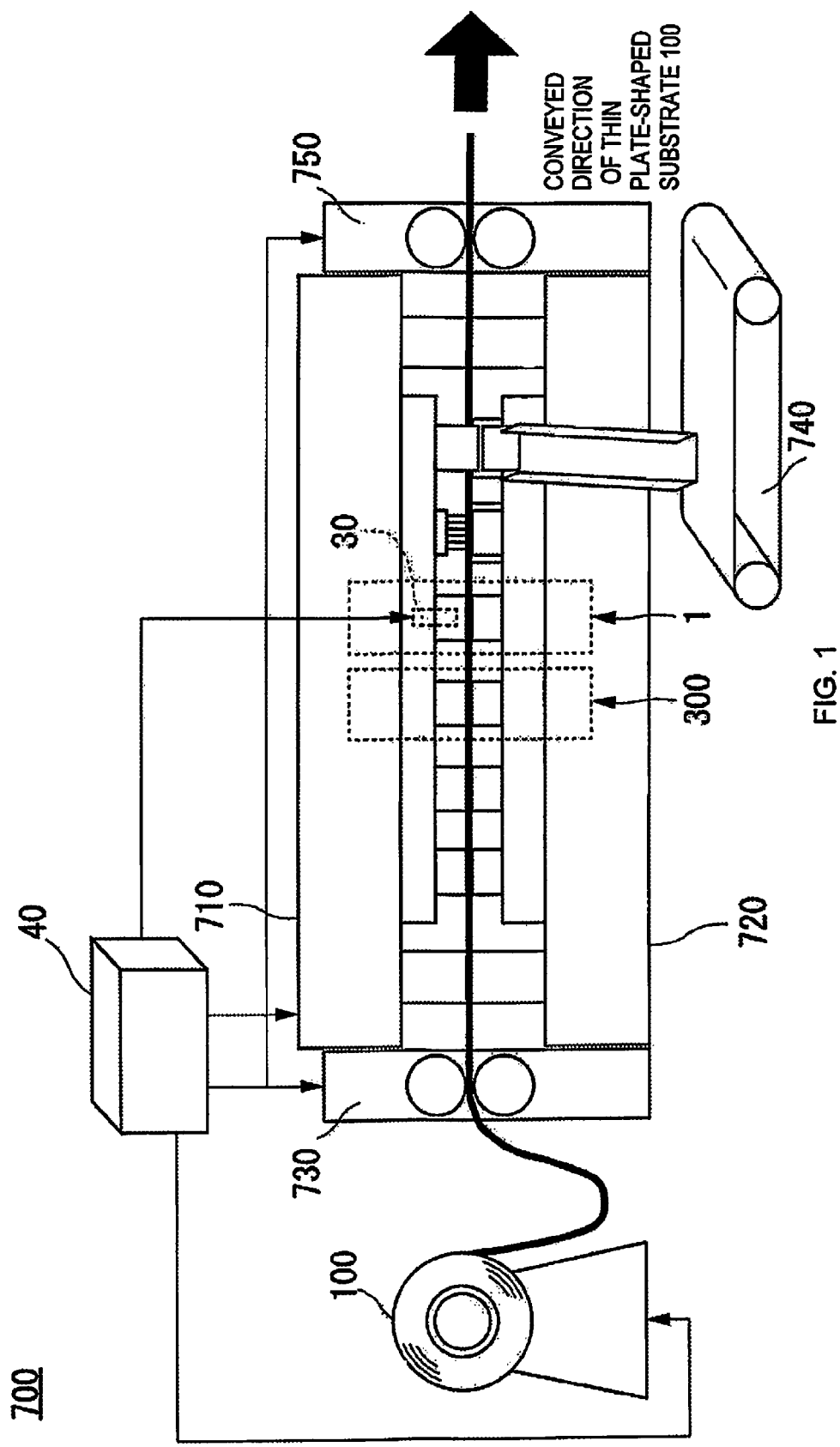
FIG. 1 is a schematic diagram showing a processing machine provided with a thin plate-shaped substrate molding device in accordance with a first embodiment.

The preferred embodiments of the present invention are described below with reference to the accompanying drawings. In the description of the drawings, identical elements are assigned identical symbols, and description is omitted where redundant. There are cases in which the sizes and ratios of the components in the drawings are exaggerated for convenience in the description and differ from the actual sizes and ratios.

First Embodiment

A processing machine 700 provided with a molding device 1 for a thin plate-shaped substrate 100 according to a first embodiment, and the molding device 1, will be described while referring to FIGS. 1 to 14.

First, the configuration of the processing machine 700 provided with the molding device 1 for the thin plate-shaped substrate 100 will be described with reference to FIG. 1. The processing machine 700 is a device for processing a metal separator from the thin plate-shaped substrate 100. The molding device 1 is disposed in the processing machine 700. The molding device 1 is a device employed to mold channels into a metal separator, as a molded article 400. The processing machine 700 is provided with a pre-molding device 300. The pre-molding device 300 is a device employed to pre-mold the thin plate-shaped substrate 100 to a prescribed irregular shape and mold a pre-molded article 200, prior to molding of the metal separator as the molded article 400 by the molding device 1.

FIG. 1 is a schematic diagram showing the processing machine 700 provided with the molding device 1 of the thin plate-shaped substrate 100 according to the first embodiment.

The processing machine 700 forms openings and the like in areas that will become metal separators, in the long, thin plate-shaped substrate 100. The openings are equivalent to locating holes for positioning purposes, and manifold holes for supplying and discharging a medium. As shown in FIG. 1, the processing machine 700 includes an upper die 710, a lower die 720, an incoming feeder 730, an outgoing conveyor 740, an outgoing feeder 750, and a controller 40.

The upper die 710 and the lower die 720 have multiple types of press dies for molding the openings and the like into the thin plate-shaped substrate 100. The multiple types of press dies are arranged along the conveying direction of the thin plate-shaped substrate 100. The locating holes, channels, and manifold holes are molded into the thin plate-shaped substrate 100 by the multiple types of press dies. The outer edge portion of the metal separator is then punched to open a punch hole.

The incoming feeder 730 conveys the yet-unprocessed thin plate-shaped substrate 100 to between the upper die 710 and the lower die 720. The incoming feeder 730 is provided to the upstream side of the upper die 710 and the lower die 720. The outgoing conveyor 740 conveys the metal separator that has been punched out from the thin plate-shaped substrate 100. The discarded thin plate-shaped substrate 100 from which the metal separator has been punched out is conveyed out from between the upper die 710 and the lower die 720 by the outgoing feeder 750. The outgoing feeder 750 is provided on the downstream side from the upper die 710 and the lower die 720. The controller 40 controls the speed and timing at which the thin plate-shaped substrate 100 is conveyed in by the incoming feeder 730, as well as the speed and timing at which the thin plate-shaped substrate 100 is conveyed out by the outgoing feeder 750, respectively. The controller 40 performs control to urge the upper die 710, which is the movable die, urged against the lower die 720, which is the stationary die, and thereafter separate the upper die 710 from the lower die 720. The controller 40 also controls the operation of the upper die 710, and controls the operation of an upper die 20 (see FIG. 2) belonging to the molding device 1 included in the upper die 710. Moreover, the controller controls the operation of tensioning portions 30 (see FIG. 2) belonging to the molding device 1.

Next, the configuration of the molding device 1 of the thin plate-shaped substrate 100 is described with reference to FIG. 2.

Figure 2:
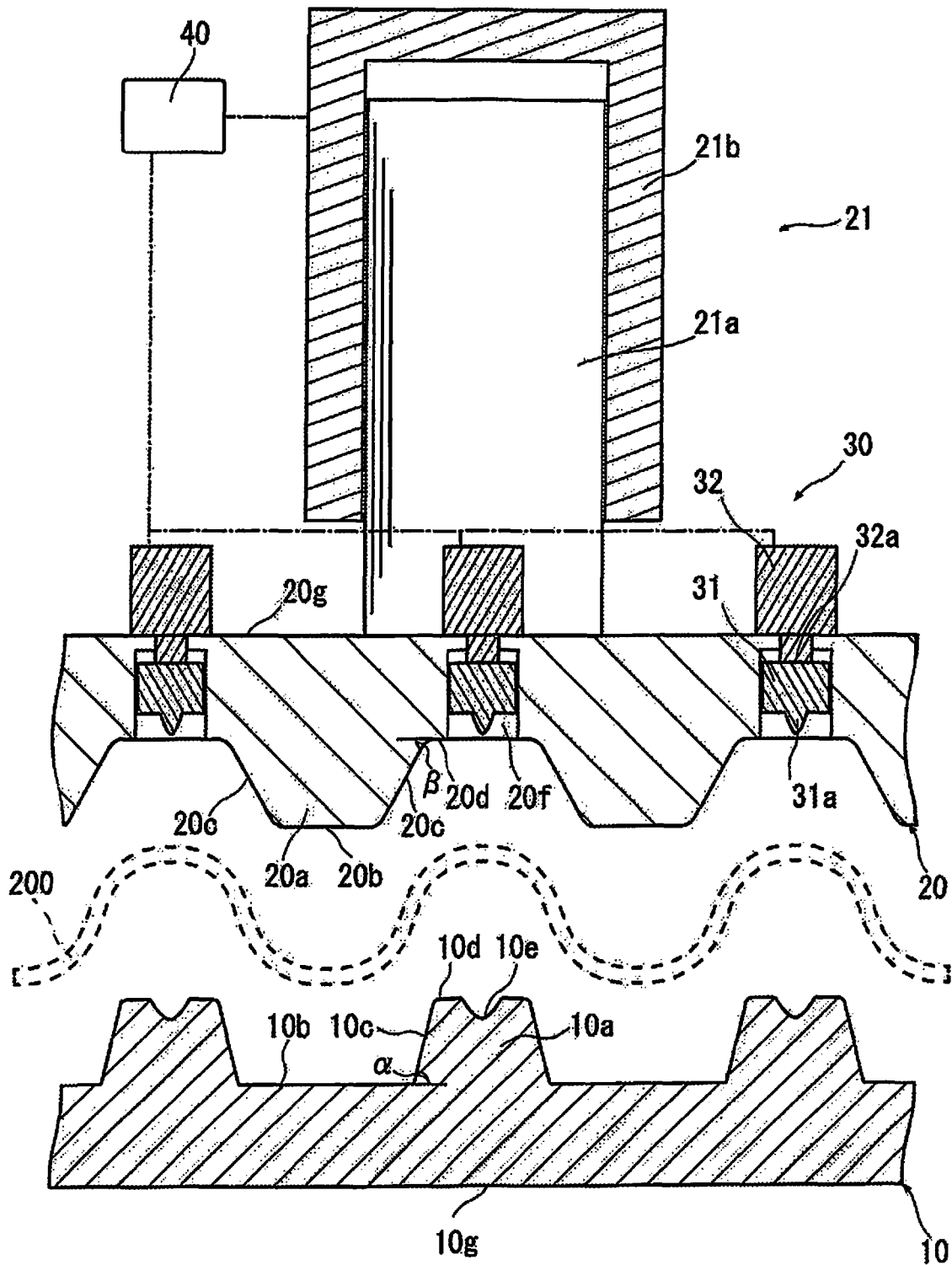
FIG. 2 is a cross sectional view showing the thin plate-shaped substrate molding device in accordance with the first embodiment.

FIG. 2 is a cross sectional view showing the molding device 1 of the thin plate-shaped substrate 100.

The molding device 1 of the first embodiment of the present invention performs press molding of the pre-molded article 200 which was obtained by pre-molding the thin plate-shaped substrate 100 to a prescribed irregular shape. To describe generally, the molding device 1 has a lower die 10 (corresponding to the first die) and an upper die 20 (corresponding to the second die) which are disposed so as to be capable of moving towards and away from each other. The molding device 1 has protruding portions 20a which are disposed on the upper die 20 so as to protrude towards the lower die 10. The protruding portions 20a have a leading edge surface 20b adapted to form stretched portions 200a through localized pressing and stretching of the pre-molded article 200, and side edge surfaces 20c adapted to induce deflection in sections that are continuous with the stretched portions 200a, forming bent portions 200b in spaces 10s in relation to the lower die 10. The molding device 1 further has the tensioning portions 30 which are adapted to tension and stretch the bent portions 200b, and the controller 40 which controls the operation of the upper die 20 and the tensioning portions 30. While the stretched portions 200a of the pre-molded article 200 are still pressed by the lower die 10 and the protruding portions 20a of the upper die 20, the controller 40 causes the bent portions 200b to be tensioned and stretched by the tensioning portions 30, imparting the shape of the protruding portions 20a to the pre-molded article 200 along the side edge surfaces 20c of the protruding portions 20a. The prescribed irregular shape of the pre-molded article 200 has been designed to an irregular shape such that the bent portions 200b will be formed. In the illustrated example, the lower die 10 is the stationary-side die, and the upper die 20 is the moveable-side die. The molding device 1 is discussed in detail below.

The lower die 10 is provided with a lower surface 10g fixed to a base (not illustrated), and an upper surface facing towards the upper die 20. The upper surface is provided with a plurality of protruding portions 10a that protrude in a direction towards the upper die 20. The plurality of protruding portions 10a are disposed adjacent to one another, spaced apart at prescribed intervals. Pressing surfaces 10b are formed between the protruding portions 10a. Each of the protruding portions 10a is provided with a leading edge surface 10d for pressing the pre-molded article 200, side edge surfaces 10c that are continuous with the leading edge surface 10d and the upper surface, and a groove 10e formed in the leading edge surface 10d. The side edge surfaces 10c extend from the upper surface at a prescribed incline angle α (where α<90°). Within the grooves 10e, portions of the pre-molded article 200 are pressed out by the tensioning portions 30.

The upper die 20 is provided with an upper surface 20g to which is attached a drive member 21 for raising and lowering the upper die 20, and a lower surface facing towards the lower die 10. The lower surface is provided with the plurality of protruding portions 20a that protrude in a direction towards the lower die 10. The plurality of protruding portions 20a are positioned next to one another, spaced apart at prescribed intervals. Pressing surfaces 20d are formed between the protruding portions 20a. Each of the protruding portions 20a is provided with a leading edge surface 20b for pressing the pre-molded article 200, and side edge surfaces 20c that are continuous with the leading edge surface 20b and the lower surface. The side edge surfaces 20c extend from the lower surface at a prescribed incline angle β (where β<90°). The incline angle β of the side edge surfaces 20c is set to a smaller angle than the incline angle α of the side edge surfaces 10c (incline angle β<incline angle α).

When the lower die 10 and the upper die 20 are clamped shut, the leading edge surfaces 20b of the upper die 20 face towards the pressing surfaces 10b of the lower die 10, and the leading edge surfaces 10d of the lower die 10 face towards the pressing surfaces 20d of the upper die 20. Because incline angle β<incline angle α, spaces 10s are formed between the side edge surfaces 10c of the lower die 10 and the side edge surfaces 20c of the upper die 20 (see FIG. 9). The stretched portions 200a, in which the pre-molded article 200 is pressed and stretched in localized fashion, are formed by the leading edge surfaces 20b and the pressing surfaces 10b. Sections that are continuous with the stretched portions 200a are induced to flex and form the bent portions 200b in the spaces 10s. Extended portions 200c that extend between adjacent bent portions 200b are pressed by the leading edge surfaces 10d and the pressing surfaces 20d.

The drive member 21 is constituted, e.g., by a hydraulic cylinder, and has a moving member 21a which is attached to the upper surface 20g of the upper die 20, and a chassis 21b which houses the moving member 20a. Through movement of the moving member 21a by hydraulic pressure, the upper die 20 is raised or lowered in a direction towards the lower die 10, or a direction away from the lower die 10.

The tensioning portions 30 are positioned between the adjacent protruding portions 20a. By pressing and moving the extended portions 200c which extend between the adjacent bent portions 200b, the tensioning portions 30 respectively tension and stretch the adjacent bent portions 200b.

The tensioning portions 30 have protruding portions 31a which are adapted to press the extended portions 200c of the pre-molded article 200. At least one projection is formed in each of the protruding portions 31a.

In the present embodiment, the tensioning portions 30 are arranged on the upper die 20 side, so as to be capable of moving towards and away from the lower die 10 (in the drawing, capable of being raised and lowered). To describe in greater detail, the tensioning portions 30 have pressing jigs 31 adapted to press the extended portions 200c of the pre-molded article 200, and driving members 32 for moving the pressing jigs 31 in a direction towards the lower die 10, or a direction away from the lower die 10 (in the drawing, capable of being raised and lowered). The protruding portions 31a are provided to the pressing jigs 31. Portions of the extended portions 200c are pressed out into the grooves 10e of the lower die 10 by the protruding portions 31a, inducing respective tensioning and stretching of the adjacent bent portions 200b. The drive members 32 are constituted, e.g., by hydraulic cylinders, with the pressing jigs 31 being attached to the distal ends of actuating rods 32a. The pressing jigs 31 move through passage holes 20f formed in the upper die 20 (in the drawing, raised and lowered).

The controller 40 controls the operation of the upper die 20 and the tensioning portions 30. The controller 40 exerts overall control of the molding device 1 to raise and lower the drive member 21, raise and lower the drive members 32, and the like. The controller 40 includes a read only memory (ROM), a central processing unit (CPU), and a random access memory (RAM). The ROM stores various control programs for controlling portions of the molding device 1. The CPU controls these portions on the basis of the various control programs. The RAM temporarily stores various types of data during control.

The controller 40 is capable of adjusting the respective operation timing of the tensioning portions 30. By doing so, it is possible for the tensioning portions 30 to tension and stretch the bent portions 200b in sequential fashion, starting from the bent portion 200b positioned at the center of the pre-molded article 200, and proceeding towards the bent portions 200b positioned at either end.

Before describing the operation of the molding device 1, a description of the operation to pre-mold the pre-molded article 200 by pressing in the molding device 1 will be made, while referring to FIGS. 3 and 4.

Figure 3:
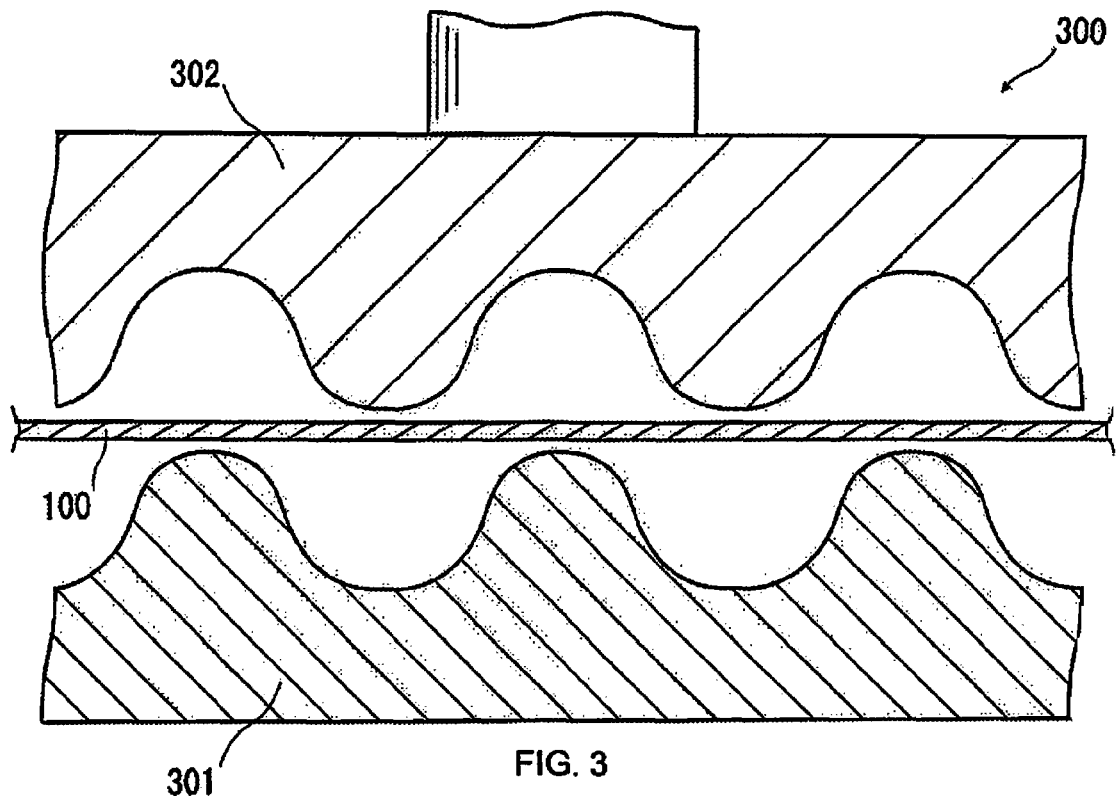
FIG. 3 is a fragmentary cross sectional view showing a thin plate-shaped substrate being conveyed into a pre-molding device in accordance with the first embodiment.

FIG. 3 is a fragmentary cross sectional view showing the thin plate-shaped substrate 100 being conveyed into a pre-molding device 300 in the first embodiment. FIG. 4 is a fragmentary cross sectional view showing completed molding of the pre-molded article 200 by the pre-molding device 300.

Figure 4:
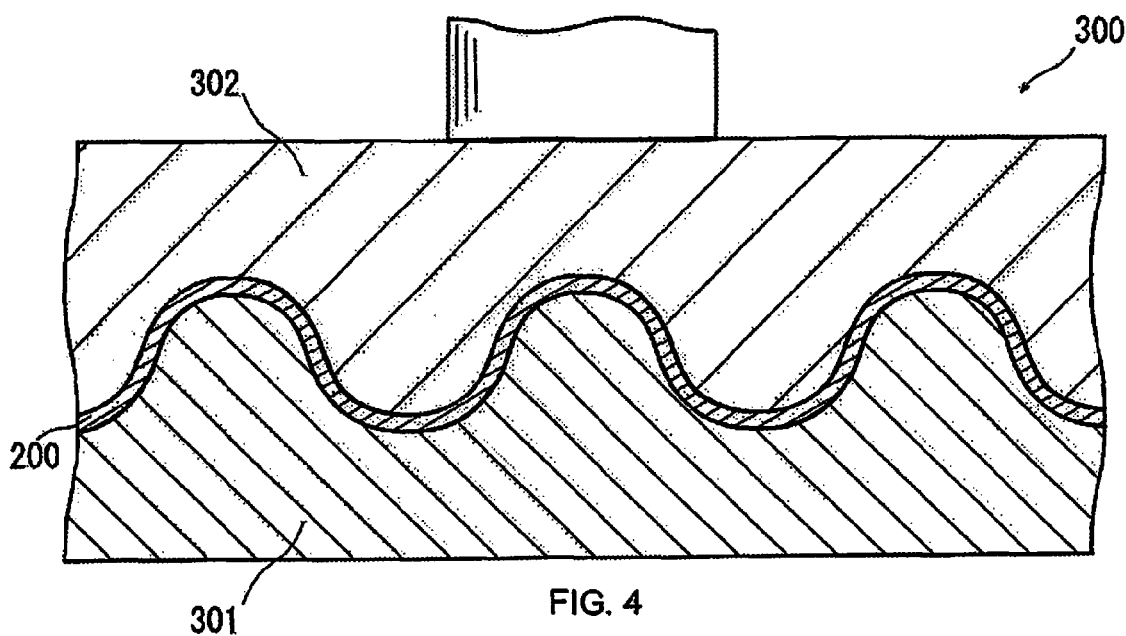
FIG. 4 is a fragmentary cross sectional view showing completed molding of a pre-molded article by the pre-molding device in accordance with the first embodiment.

As shown in FIGS. 3 and 4, the pre-molding device 300 has a pre-molding lower die 301, which is a stationary die, and a pre-molding upper die 302, which is a movable die.

Firstly, as shown in FIG. 3, the thin plate-shaped substrate 100 is conveyed to between the pre-molding lower die 301 and the pre-molding upper die 302. Next, the pre-molding upper die 302 is moved towards the pre-molding lower die 301 and the thin plate-shaped substrate 100. The pre-molding lower die 301 and the pre-molding upper die 302 are clamped shut, thereby initiating pressing of the thin plate-shaped substrate 100.

Once pressing of the thin plate-shaped substrate 100 by the pre-molding lower die 301 and the pre-molding upper die 302 has been completed, as shown in FIG. 4, the pre-molding device 300 forms the pre-molded article 200 by pre-molding the thin plate-shaped substrate 100 to a pre-scribed irregular shape. This prescribed irregular shape of the pre-molded article 200 is an irregular shape such that the bent portions 200b will be formed.

Next, the thin plate-shaped substrate 100 molding method will be described, while referring to FIG. 5.

Figure 5:
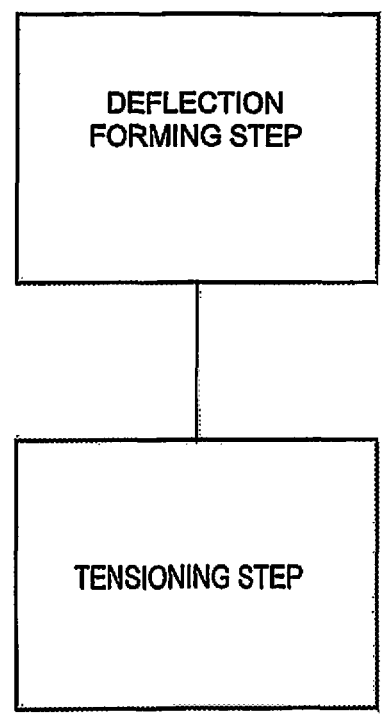
FIG. 5 is a flowchart showing the thin plate-shaped substrate molding method in accordance with the first embodiment.

FIG. 5 is a flowchart showing the thin plate-shaped substrate 100 molding method.

This thin plate-shaped substrate 100 molding method involves subjecting the pre-molded article 200, which has been obtained by pre-molding the thin plate-shaped substrate 100 to a prescribed irregular shape, to press molding by the lower die 10 (corresponding to the first die) and the upper die 20 (corresponding to the second die) which are disposed so as to be capable of moving towards and away from each other. This thin plate-shaped substrate 100 molding method has a deflection-forming step and a tensioning step. In the deflection-forming step, the stretched portions 200a are formed through localized pressing and stretching of the pre-molded article 200 by the lower die 20 and the leading edges of the protruding portions 10a which are provided to the upper die 20 and which protrude towards the lower die 20; additionally, sections that are continuous with the stretched portions 200a are induced to flex and form the bent portions 200b in the spaces 10s which have formed between the lower die 20 and the protruding portions 20a of the upper die 20. In the tensioning step, with the stretched portions 200a of the pre-molded article 200 still being pressed by the lower die 10 and the protruding portions 20a of the upper die 20, the bent portions 200b are tensioned and stretched to conform to the side edges that are continuous with the leading edges of the protruding portions 20a, imparting the shape of the protruding portions 20a to the pre-molded article 200. The prescribed irregular shape of the pre-molded article 200 is an irregular shape such that the bent portions 200b will be formed in the deflection-forming step. The molding device 1 discussed above is a molding device that embodies the thin plate-shaped substrate 100 molding method.

Next, the operation of the molding device 1 will be described while referring to FIGS. 7 to 14 in addition to the flowchart of FIG. 6.

Figure 6:
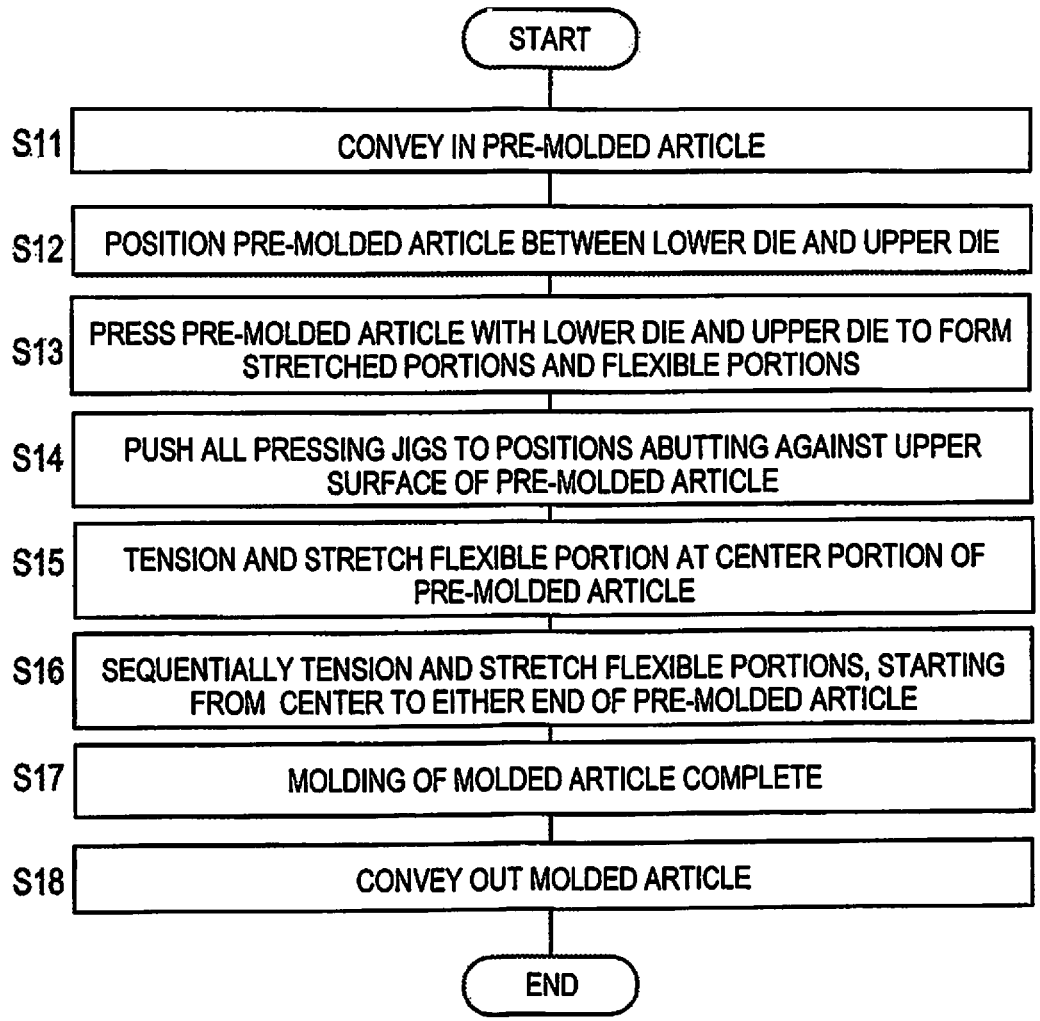
FIG. 6 is a flowchart showing operation of the thin plate-shaped substrate molding device in accordance with the first embodiment.
Figure 7:
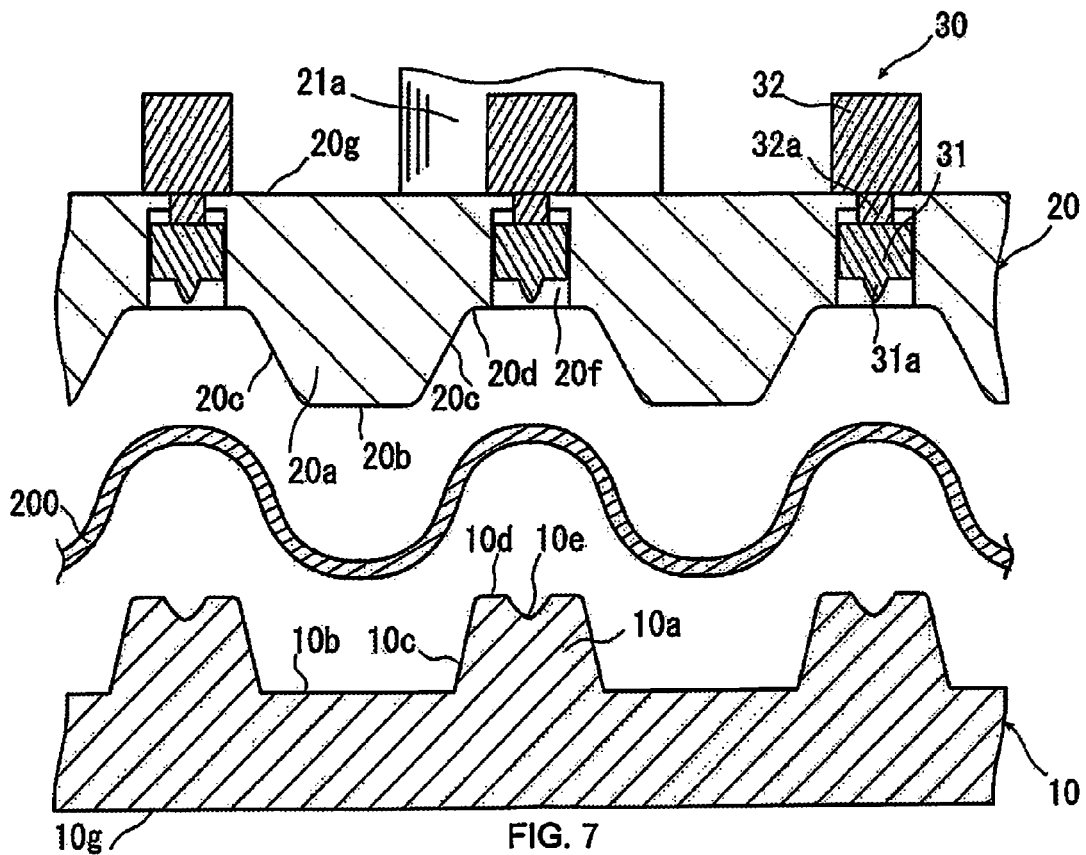
FIG. 7 is a fragmentary cross sectional view showing a pre-molded article being conveyed into the molding device in accordance with the first embodiment.
Figure 8:
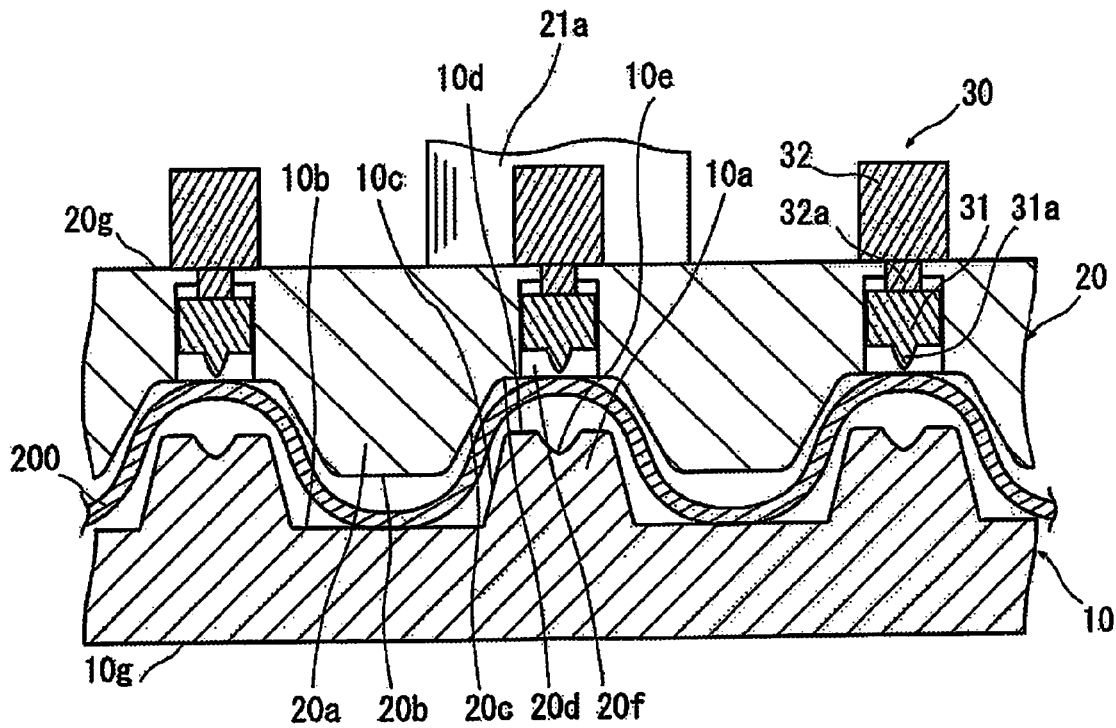
FIG. 8 is a fragmentary cross sectional view showing a pre-molded article in a state just prior to being pressed by a stationary die and a moveable die in accordance with the first embodiment.
Figure 9:
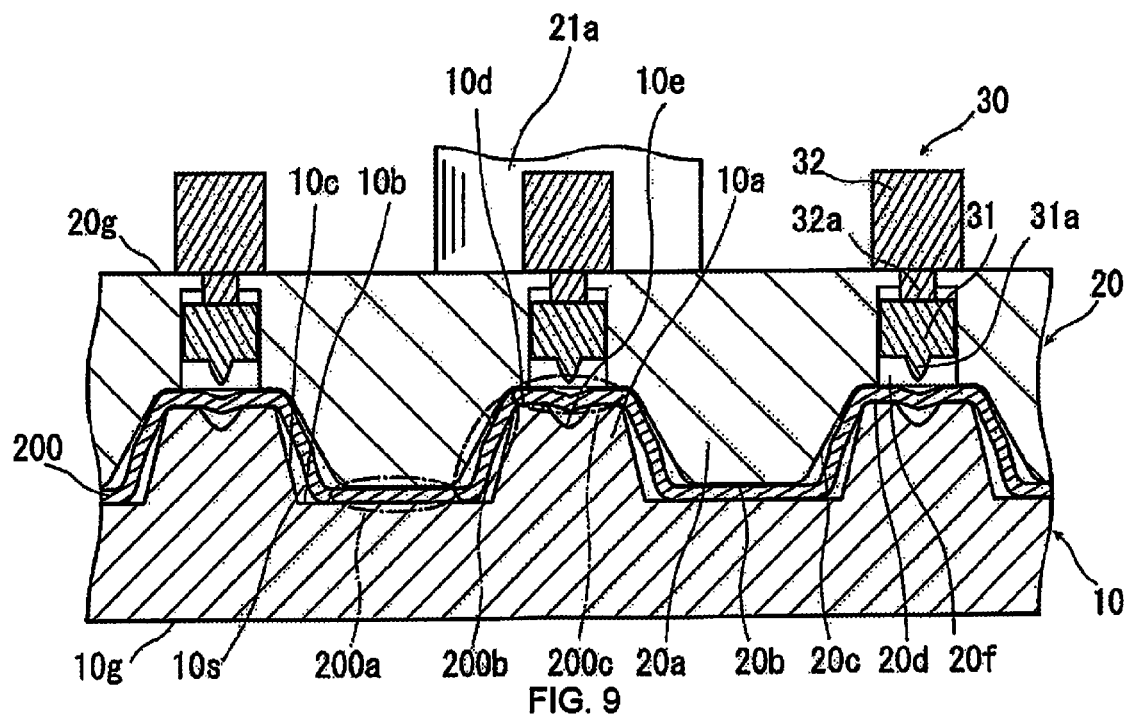
FIG. 9 is a fragmentary cross sectional view showing a state in which a pre-molded article is pressed by the stationary die and the moveable die, forming bent portions, in accordance with the first embodiment.
Figure 10:
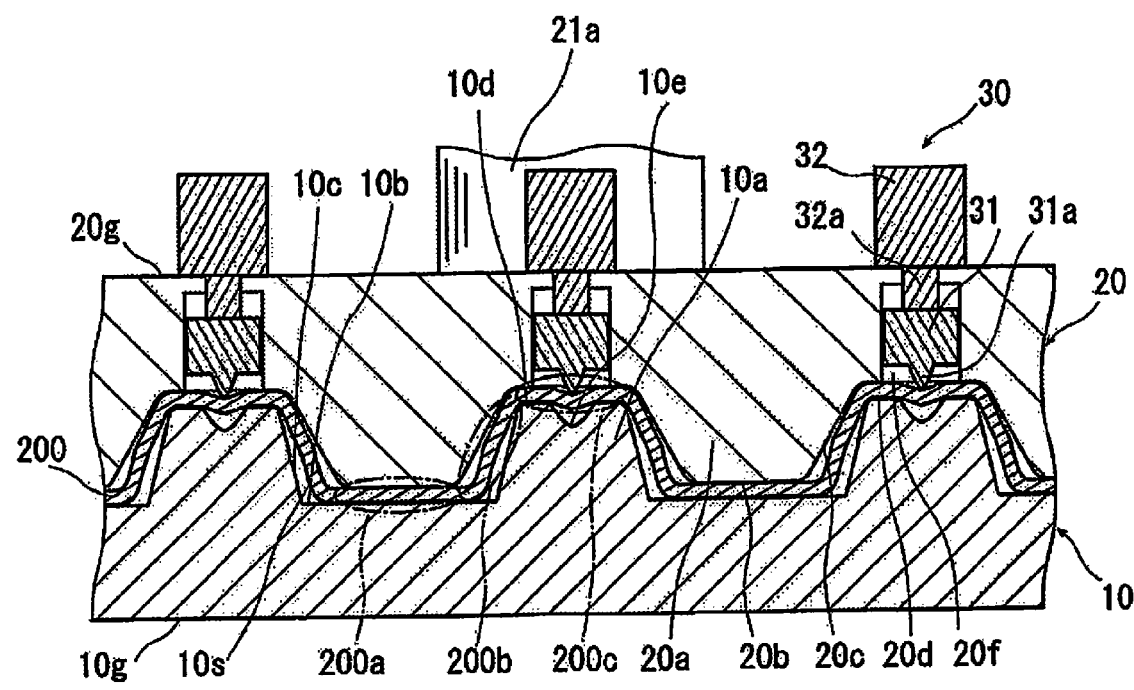
FIG. 10 is a fragmentary cross sectional view showing a state in which all of the tensioning portions have moved to positions contacting the upper surface of the pre-molded article in accordance with the first embodiment.
Figure 11:
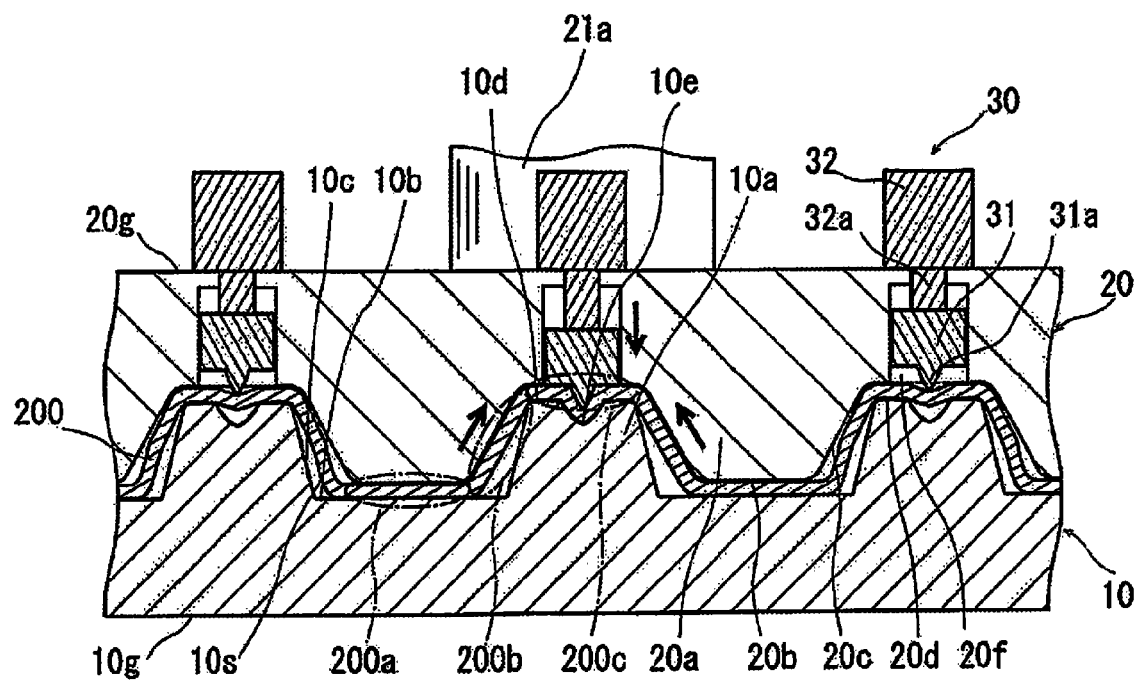
FIG. 11 is a fragmentary cross sectional view showing a state in which the tensioning portions are tensioning and stretching the bent portion at the center of the pre-molded article in accordance with the first embodiment.
Figure 12:
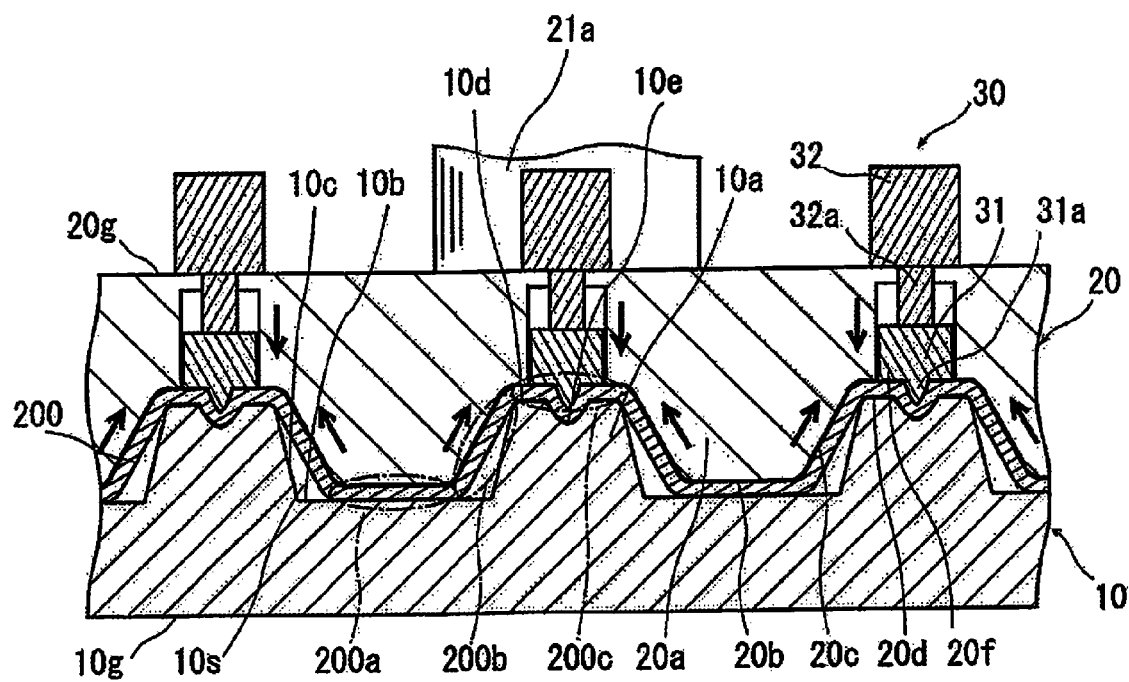
FIG. 12 is a fragmentary cross sectional view showing a state in which the tensioning portions are tensioning and stretching the bent portions in sequential fashion, starting from the bent portions adjacent to the bent portion at the center and proceeding to the bent portions at the ends of the pre-molded article in accordance with the first embodiment.
Figure 13:
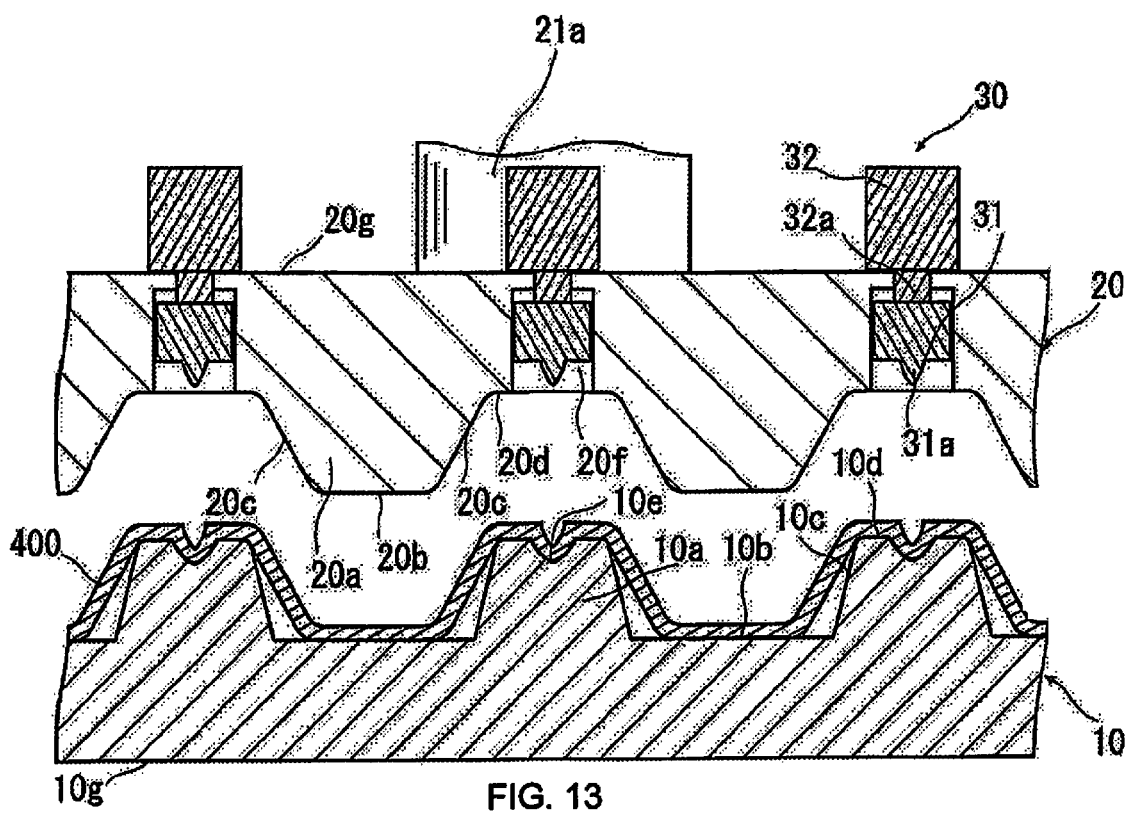
FIG. 13 is a fragmentary cross sectional view showing completed molding of a molded article by the molding device in accordance with the first embodiment.
Figure 14:
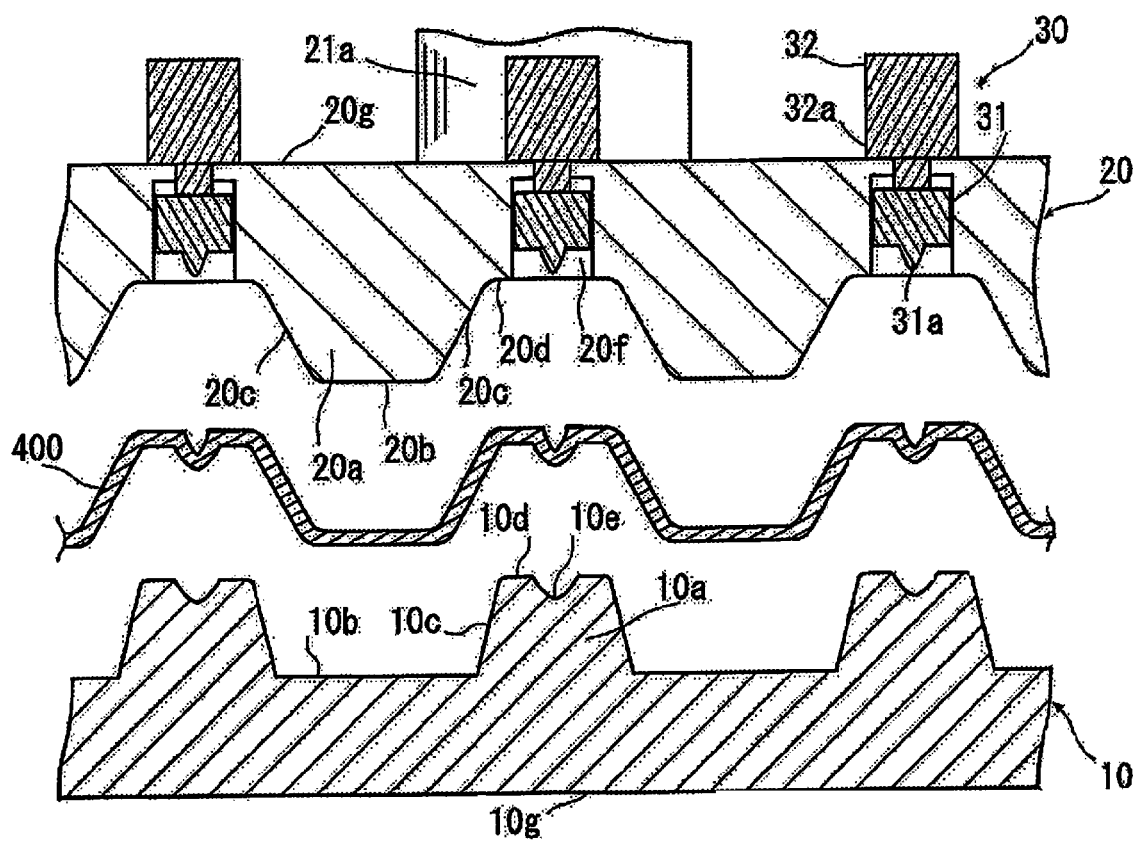
FIG. 14 is a fragmentary cross sectional view showing the molded article being conveyed out from the molding device in accordance with the first embodiment.

FIG. 6 is a flowchart showing operation of the molding device 1 of the thin plate-shaped substrate 100. FIG. 7 is a fragmentary cross sectional view showing the pre-molded article 200 being conveyed into the molding device 1. FIG. 8 is a fragmentary cross sectional view showing the pre-molded article 200 in a state just prior to being pressed by the lower die 10 and the upper die 20. FIG. 9 is a fragmentary cross sectional view showing a state in which the pre-molded article 200 is pressed by the lower die 10 and the upper die 20, forming the bent portions 200b. FIG. 10 is a fragmentary cross sectional view showing a state in which all of the tensioning portions 30 have moved to positions contacting the upper surface of the pre-molded article 200. FIG. 11 is a fragmentary cross sectional view showing a state in which the tensioning portions 30 are tensioning and stretching the bent portion 200b at the center of the pre-molded article 200. FIG. 12 is a fragmentary cross sectional view showing a state in which the tensioning portions 30 are tensioning and stretching the bent portions 200b in sequential fashion, starting from the bent portions 200b adjacent to the bent portion 200b at the center and proceeding to the bent portions 200b at the ends of the pre-molded article 200. FIG. 13 is a fragmentary cross sectional view showing completed molding of the molded article 400 by the molding device 1. FIG. 14 is a fragmentary cross sectional view showing the molded article 400 being conveyed out from the molding device 1.

When molding by the molding device 1 is initiated (Start), first, as shown in FIG. 7, with the upper die 20 separated from the lower die 10, the pre-molded article 200 is conveyed to between the upper die 10 and the lower die 20 (Step S11). After the pre-molded article 200 has been conveyed in, the pre-molded article 200 is positioned on the lower die 10 in such a way that the irregular shape of the pre-molded article 200 corresponds to the irregular shape of the lower die 10 (Step S12). Next, as shown in FIG. 8, the upper die 20 descends towards the lower die 10 and the pre-molded article 200. The descending upper die 20 presses the pre-molded article 200 in the downward direction in the drawing.

Once the upper die 20 has completed its descent, as shown in FIG. 9, the pressing surfaces 10b of the lower die 10 and the leading edge surfaces 20b of the protruding portions 20a of the upper die 20 press and stretch the pre-molded article 200 in localized fashion, forming the stretched portions 200a. In the spaces 10s formed between the side edge surfaces 10c of the lower die 10 and the side edge surfaces 20c of the upper die 20, sections that are continuous with the stretched portions 200a are induced to flex, forming the bent portions 200b (Step S13).

After the bent portions 200b are formed, as shown in FIG. 10, the drive members 32 of the tensioning portions 30, through the agency of the actuating rods 32a, push the pressing jigs 31 to positions at which the protruding portions 31a at the leading edges of the pressing jigs 31 contact the upper surface of the pre-molded article 200 (Step S14).

Next, the tensioning portion 30 pushes in a downward direction the pressing jig (center pressing jig) 31 that is positioned at the center in the lengthwise direction of the upper die 20. As shown in FIG. 11, the center pressing jig 31 that has been pushed in the downward direction pushes the extended portion (center extended portion) 200c at a position corresponding to the protruding portion 31a towards the groove 10e provided to the lower die 10. When the center extended portion 200c is pushed in the downward direction, the bent portions (center bent portions) 200b that neighbor the center extended portion 200c are tensioned and stretched (Step S15). Because the center bent portions 200b are tensioned along the side edge surfaces 20c of the protruding portion 20a of the upper die 20, the shape of the protruding portion 20a is imparted to the pre-molded article 200.

Next, the tensioning portions 30 sequentially push the pressing jigs 31 towards the pre-molded article 200, starting from the pressing jigs 31 that neighbor the center pressing jig 31 and proceeding towards the pressing jigs 31 positioned at the ends of the upper die 20. As shown in FIG. 12, the pushed pressing jigs 31 push the extended portions 200c at positions corresponding to the protruding portions 31a towards the grooves 10e of the lower die 10. By pushing of the extended portions 200c, the bent portions 200b that neighbor each of the extended portions 200c are tensioned and stretched (Step S16). At this time, because the bent portions 200b are tensioned along the side edge surfaces 20c of the protruding portions 20a of the upper die 20, the shapes of the protruding portions 20a are imparted to the pre-molded article 200.

Next, as shown in FIG. 13, when the stretching of all of the bent portions 200b through tensioning thereof by the tensioning portions 30 has been completed, the upper die 20 is moved and separated from the lower die 10. By separating the upper die 20 from the lower die 10, the process of molding the molded article 400 from which distortion arising during molding of the thin plate-shaped substrate 100 has been eliminated is completed (Step S17). The molded article 400 for which molding is complete is conveyed out from the molding device 1 (Step S18).

The molding device 1 of the thin plate-shaped substrate 100 of the first embodiment discussed above affords the following working effects.

The present molding device 1 of the thin plate-shaped substrate 100 performs press molding of the pre-molded article 200, which was obtained by pre-molding the thin plate-shaped substrate 100 to a prescribed irregular shape. The molding device 1 has a lower die 10 and an upper die 20, protruding portions 20a, tensioning portions 30, and a controller 40. The lower die 10 and the upper die 20 are disposed so as to be capable of moving towards and away from each other. The protruding portions 20a are disposed on the upper die 20 so as to protrude towards the lower die 10, and are provided with leading edge surfaces 20b for forming stretched portions 200a stretched by localized pressing of the pre-molded article 200, and with side edge surfaces 20c for inducing deflection of sections that are continuous with the stretched portions 200a, forming bent portions 200b in the spaces 10s formed in relation to the lower die 10. The tensioning portions 30 tension and stretch the bent portions 200b. The controller 40 controls the operation of the lower die 10, the upper die 20, and the tensioning portions 30. While the stretched portions 200a of the pre-molded article 200 are still pressed by the lower die 10 and the protruding portions 20a of the upper die 20, the bent portions 200b are tensioned and stretched by the tensioning portions 30, imparting the shape of the protruding portions 20a to the pre-molded article 200 along the side edge surfaces 20c of the protruding portions 20a. The prescribed irregular shape of the pre-molded article 200 is an irregular shape such that bent portions 200b will be formed.

According to this configuration, the molding device 1 forms the stretched portions 200a which have been stretched through localized pressing of the pre-molded article 200 by the lower die 10 and the leading edge surfaces 20b of the protruding portions 20a provided to the upper die 20, as well as inducing deflection in sections that are continuous with the stretched portions 200a, forming the bent portions 200b. Thereafter, while the stretched portions 200a are still pressed, the molding device 1 tensions and stretches the bent portions 200b, imparting the shape of the protruding portions 20a to the pre-molded article 200 along the side edge surfaces 20c which are continuous with the leading edge surfaces 20b of the protruding portions 20a. In this way, the molding device 1 presses the pre-molded article 200 and forms the stretched portions 200a, while simultaneously forming the bent portions 200b, and tensions and stretches the bent portions 200b while still in the pressed state. Consequently, the molding device 1 can eliminate distortion arising during molding of the thin plate-shaped substrate 100, making possible molding of the thin plate-shaped substrate 100 with no residual distortion.

When a substrate for metal separators in a fuel cell is implemented as the thin plate-shaped substrate 100, a metal separator free from residual distortion can be obtained, and channels that have the designed channel cross sectional shape can be formed. When metal separators free from residual distortion are stacked together, channels that have the designed channel cross sectional shape can be formed for the cooling water passages that are formed between the metal separators. For this reason, the designed cooling water flow speed can be achieved, uneven cooling performance can be prevented, and heat radiation can take place smoothly. As a result, it is possible to provide a fuel cell that can consistently supply power.

Further, with this molding device 1, the plurality of protruding portions 20a are disposed adjacent one another on the upper die 20, and the tensioning portions 30 are arranged between the adjacent protruding portions 20a so as to press and move the extended portions 200c that extend between the adjacent bent portions 200b, thereby respectively tensioning and stretching the adjacent bent portions 200b.

According to this configuration, while the adjacent protruding portions 20a are pressing the stretched portions 200a, the extended portions 200c are pressed. By pressing the extended portions 200c in this way, the bent portions 200b can be tensioned and stretched while adjusting the tensile force simply and reliably.

Further, in this molding device 1, the tensioning portions 30 are provided with the protruding portions 31a for pressing the extended portions 200c of the pre-molded article 200, and the protruding portions 31a have a least one projection.

According to this configuration, the extended portions 200c are pressed by the at least one projection formed on each of the protruding portions 31a. By pressing the extended portions 200c in this manner using the projections, the bent portions 200b can be tensioned and stretched in a reliable manner, with a minimum of pressing force.

Further, with this molding device 1, the tensioning portions 30 tension and stretch the bent portions 200b in sequential fashion, starting from the bent portion 200b positioned at the center and proceeding to the bent portions 200b positioned at either end of the pre-molded article 200.

According to this configuration, distortions can be smoothed out from the center bent portion 200b of the pre-molded article 200, and the bent portions 200b then tensioned and stretched while pushing out distortions in sequential fashion in directions towards either end of the pre-molded article 200. Because the bent portions 200b are tensioned and stretched while pushing out distortions towards either end of the pre-molded article 200 in this way, distortions arising during molding of the thin plate-shaped substrate 100 can be eliminated reliably.

The thin plate-shaped substrate 100 molding method according to the first embodiment described above affords the following working effects.

With the present thin plate-shaped substrate 100 molding method, the pre-molded article 200 which has been pre-molded to a prescribed irregular shape from the thin plate-shaped substrate 100 is press-molded by the lower die 10 and the upper die 20 which are disposed so as to be capable of moving towards and away from each other. The thin plate-shaped substrate 100 molding method has the deflection forming step and the tensioning step. In the deflection forming step, the stretched portions 200a which are stretched by localized pressing of the pre-molded article 200 by the lower die 10 and the leading edge surfaces 20b of the protruding portions 20a which are disposed on the upper die 20 and protrude towards the lower die 10 are formed, and deflection is induced in sections that are continuous with the stretched portions 200a, forming the bent portions 200b in the spaces 10s that are formed between the lower die 10 and the protruding portions 20a of the upper die 20. In the tensioning step, with the stretched portions 200a of the pre-molded article 200 still being pressed by the lower die 10 and the protruding portions 20a of the upper die 20, the bent portions 200b are tensioned and stretched, imparting the shape of the protruding portions 20a to the pre-molded article 200 along the side edge surfaces 20c that are continuous with the leading edge surfaces 20b of the protruding portions 20a. The prescribed irregular shape of the pre-molded article 200 is an irregular shape such that the bent portions 200b will be formed in the deflection forming step.

According to this method, the stretched portions 200a are formed by localized pressing and stretching of the pre-molded article 200 by the lower die 10 and the leading edge surfaces 20b of the protruding portions 20a provided to the upper die 20, and deflection is induced in sections that are continuous with the stretched portions 200a, forming the bent portions 200b. Thereafter, while continuing to press the stretched portions 200a, the bent portions 200b are tensioned and stretched, imparting the shape of the protruding portions 20a to the pre-molded article 200 along the side edge surfaces 20c which are continuous with the leading edge surfaces 20b of the protruding portions 20a. In this way, at the same time that the pre-molded article 200 is being pressed to form the stretched portions 200a, the bent portions 200b are formed, and the bent portions 200b are tensioned and stretched while still in the pressed state. Consequently, according to this thin plate-shaped substrate 100 molding method and the molding device 1, distortions arising during molding of the thin plate-shaped substrate 100 can be eliminated, and it is possible to mold the thin plate-shaped substrate 100 without residual distortion.

Further, with the present molding method, the upper die 20 is provided with the plurality of adjacent protruding portions 20a, and in the tensioning step, the extended portions 200c that extend between the adjacent bent portions 200b are pressed and moved between the adjacent protruding portions 20a, thereby respectively tensioning and stretching the adjacent bent portions 200b.

According to this method, while the adjacent protruding portions 20a are pressing the stretched portions 200a, the extended portions 200c are pressed. By pressing the extended portions 200c in this way, the bent portions 200b can be tensioned and stretched while adjusting the tensile force simply and reliably.

Further, with the present method, in the tensioning step, the extended portions 200c of the pre-molded article 200 are pressed using the protruding portions 31a, at least one projection being formed on each of the protruding portions 31a.

According to this method, the extended portions 200c are pressed by the at least one projection formed on each of the protruding portions 31a. By pressing the extended portions 200c in this manner using the projections, the bent portions 200b can be tensioned and stretched in a reliable manner, with a minimum of pressing force.

Further, with the present method, in the tensioning step, the bent portions 200b are tensioned and stretched in sequential fashion, starting from the bent portion 200b positioned at the center and proceeding to the bent portions 200b positioned at either end of the pre-molded article 200.

According to this method, distortions can be smoothed out from the center bent portion 200b of the pre-molded article 200, and the bent portions 200b then tensioned and stretched while pushing out distortions in sequential fashion in directions towards either end of the pre-molded article 200. Because the bent portions 200b are tensioned and stretched while pushing out distortions towards either end of the pre-molded article 200 in this way, distortions arising during molding of the thin plate-shaped substrate 100 can be eliminated reliably.

Second Embodiment

Next, a thin plate-shaped substrate molding method according to a second embodiment, and a molding device 2 embodying the method, will be described while referring to FIGS. 15 to 17B. In the second embodiment, parts having configurations similar to those in the previously described first embodiment are assigned the same symbols, and the preceding discussion is omitted.

In the present embodiment, the tensioning portions 30 are provided to a lower die 50, which is a stationary die. The second embodiment differs from the molding device 1 of the first embodiment, in that the tensioning portions 30 are provided to the lower die 50 in this manner.

First, the configuration of the thin plate-shaped substrate 100 molding device 2 will be described while referring to FIG. 15.

Figure 15:
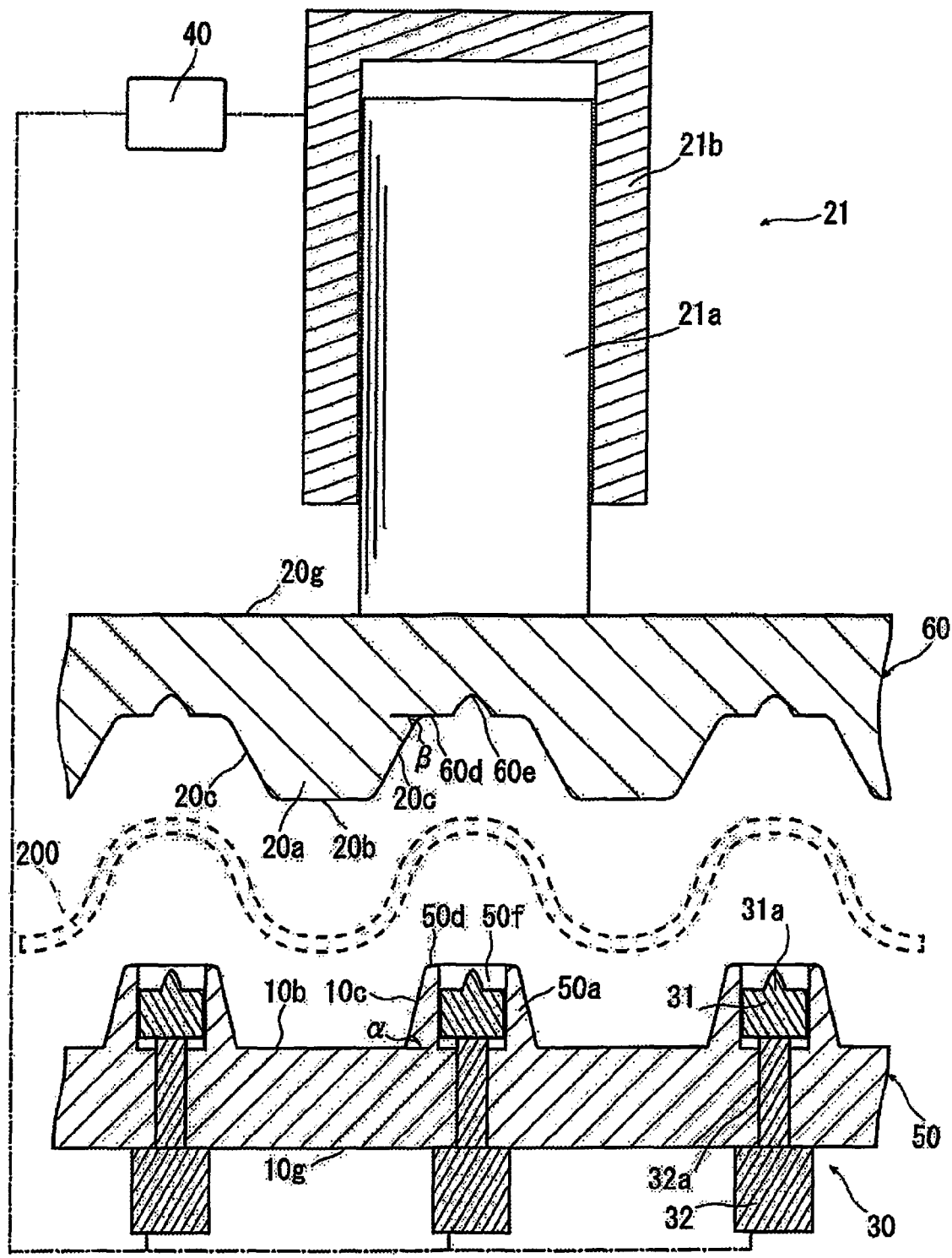
FIG. 15 is a cross sectional view of a thin plate-shaped substrate molding device in accordance with a second embodiment.

FIG. 15 is a cross sectional view showing the thin plate-shaped substrate 100 molding device 2.

As shown in FIG. 15, the molding device 2 has a lower die 50, and upper die 60, tensioning portions 30, and a controller 40. The configurations of the molding device 2 are described in detail below.

The lower die 50 is provided with a lower surface 10g, and an upper surface facing towards the upper die 60. A drive member 32 for each of the tensioning portions 30 is attached to the lower surface 10g. The upper surface is provided with a plurality of protruding portions 50a that protrude in a direction towards the upper die 60. The plurality of protruding portions 50a are disposed adjacent to one another, spaced apart at prescribed intervals. Pressing surfaces 10b are formed between the protruding portions 50a. Each of the protruding portions 50a has a leading edge surface 50d for pressing the pre-molded article 200, side edge surfaces 50c that are continuous with the leading edge surface 50d and the upper surface, and a passage hole 50f for movement (in the drawing, vertical movement) of the pressing jig 31 of the tensioning portion 30. The passage hole 50f opens onto the leading edge surface 50d. The configuration of the lower die 50 is otherwise the same as the configuration of the lower die 10 of the first embodiment.

The upper die 60 is provided with an upper surface 20g, and a lower surface that faces towards the lower die 10. The lower surface is provided with a plurality of protruding portions 20a that protrude in a direction towards the lower die 50. The plurality of protruding portions 20a are disposed adjacent to one another, spaced apart at prescribed intervals. Pressing surfaces 60d are formed between the protruding portions 20a. Each of the pressing surfaces 60d has a groove 60e for pushing out a portion of the pre-molded article 200 during tensioning of the bent portions 200b of the pre-molded article 200 by the tensioning portions 30. The pressing surfaces 60d lack the passage holes 20f like those of the pressing surfaces 20d of the upper die 20 of the first embodiment. The configuration of the upper die 60 is otherwise the same as the configuration of the upper die 20 of the first embodiment.

When the lower die 50 and the upper die 60 are clamped shut, the leading edge surfaces 20b of the upper die 60 face towards the pressing surfaces 10b of the lower die 50, and the leading edge surfaces 50d of the lower die 50 face towards the pressing surfaces 60d of the upper die 20. Because incline angle β<incline angle α, spaces 10s are formed between the side edge surfaces 10c of the lower die 50 and the side edge surfaces 20c of the upper die 60 (see FIG. 17B). Stretched portions 200a in which the pre-molded article 200 has been pressed and stretched in localized fashion are formed by the leading edge surfaces 20b and the pressing surfaces 10b. Sections that are continuous with the stretched portions 200a are induced to flex and form the bent portions 200b in the spaces 10s. Extended portions 200c that extend between adjacent bent portions 200b are pressed by the leading edge surfaces 50d and the pressing surfaces 60d.

In the present embodiment, the tensioning portions 30 are arranged on the lower die 50 side, so as to be capable of moving towards and away from the upper die 60 (in the drawing, capable of being raised and lowered). To the drive members 32 of the tensioning portions 30 are attached, via actuating rods 32a, the pressing jigs 31, the pressing jigs 31 being moved in a direction towards the upper die 60 or a moved in a direction away from the upper die 60 (in the drawing, raised and lowered). The drive members 32 push the actuating rods 32a towards the upper die 60 so that the pressing jigs 31 approach the upper die 60. The drive members 32 also pull the actuating rods 32a in a direction away from the upper die 60 so that the pressing jigs 31 separate from the upper die 60.

The controller 40 controls the operation of the upper die 60 and the tensioning portions 30.

The controller 40 exerts overall control of the molding device 2 to raise and lower the drive member 21, raise and lower the drive members 32, and the like.

Next, the operation of the molding device 2 will be described while referring to FIGS. 17A and 17B in addition to the flowchart of FIG. 16.

Figure 16:
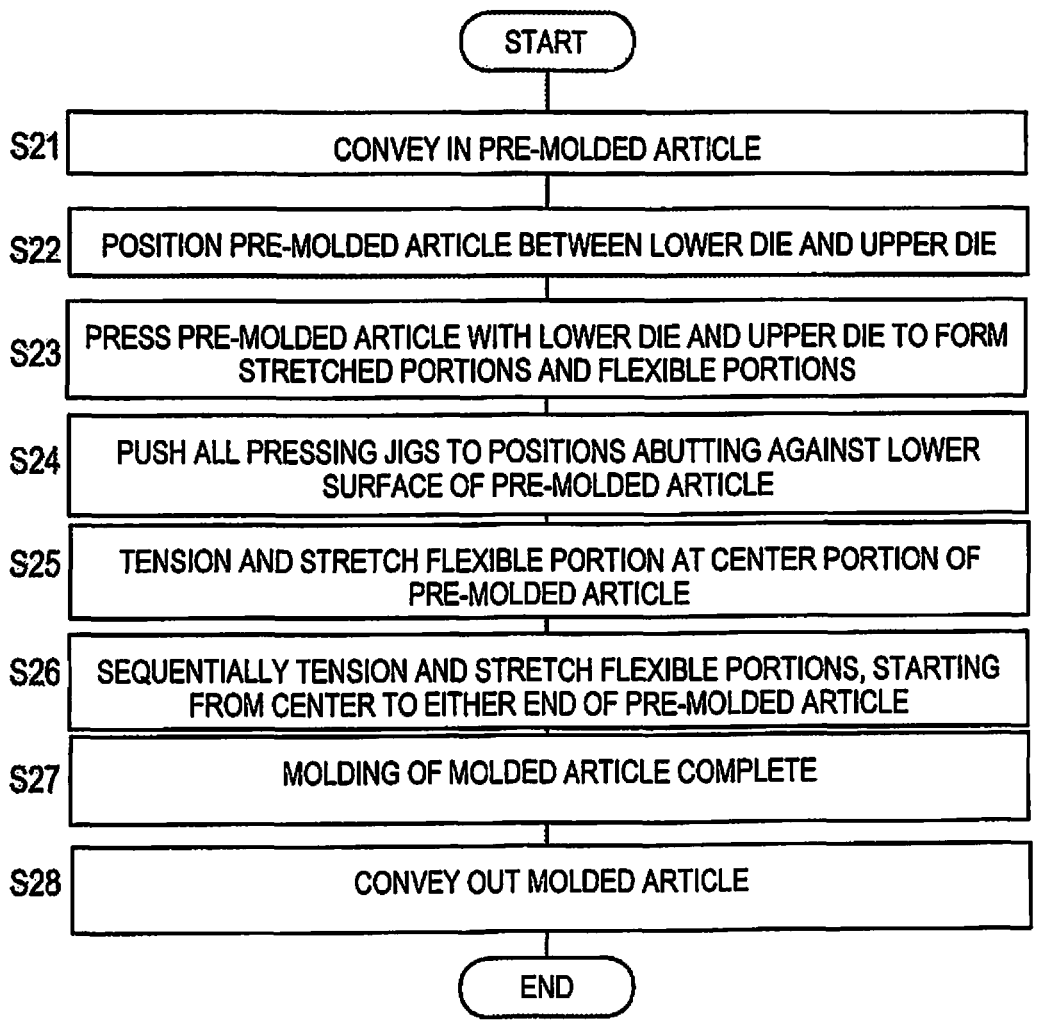
FIG. 16 is a flowchart showing operation of the thin plate-shaped substrate molding device in accordance with the second embodiment.

FIG. 16 is a flowchart showing operation of the thin plate-shaped substrate 100 molding device 2. FIGS. 17A and 17B are drawings describing the molding operation of a molded article 500 by the molding device 2. FIG. 17A is a fragmentary cross sectional view showing the pre-molded article 200 being conveyed into the molding device 2. FIG. 17B is a fragmentary cross sectional view showing a state in which all of the tensioning portions 30 tension and stretch all of the bent portions 200b.

Figure 17A:
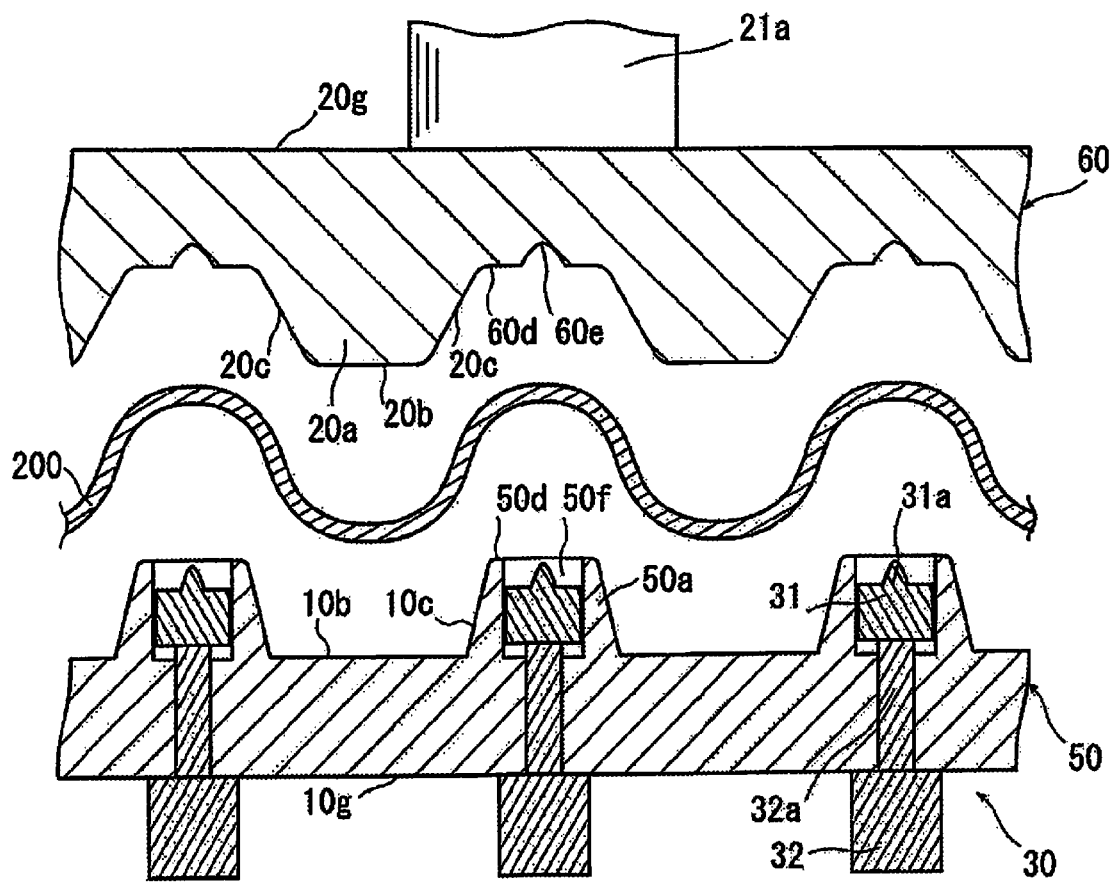
FIG. 17A is a fragmentary cross sectional view showing a pre-molded article being conveyed into the molding device for performing a molding operation of a molded article by the molding device in accordance with the second embodiment.

When molding by the molding device 2 is initiated (Start), first, as shown in FIG. 17A, with the upper die 60 separated from the lower die 50, the pre-molded article 200 is conveyed to between the upper die 50 and the lower die 60 (Step S21). After the pre-molded article 200 has been conveyed in, the pre-molded article 200 is positioned on the lower die 50 in such a way that the irregular shape of the pre-molded article 200 corresponds to the irregular shape of the lower die 50 (Step S22). Next, the upper die 60 descends towards the lower die 50 and the pre-molded article 200. The descending upper die 60 presses the pre-molded article 200 in the downward direction in the drawing.

Once the upper die 60 has completed its descent, the pressing surfaces 10b of the lower die 50 and the leading edge surfaces 20b of the protruding portions 20a of the upper die 60 press and stretch the pre-molded article 200 in localized fashion, forming the stretched portions 200a. Then, in the spaces 10s formed between the side edge surfaces 10c of the lower die 50 and the side edge surfaces 20c of the upper die 60, sections that are continuous with the stretched portions 200a are induced to flex, forming the bent portions 200b (Step S23).

After the bent portions 200b are formed, the drive members 32, through the agency of the actuating rods 32a, push out the pressing jigs 31 to positions at which the protruding portions 31a at the leading edges of the pressing jigs 31 contact the lower surface of the pre-molded article 200 (Step S24).

Next, the tensioning portion 30 pushes in an upward direction the pressing jig (center pressing jig) 31 that is positioned at the center in the lengthwise direction of the upper die 60. The center pressing jig 31 that has been pushed in the upward direction pushes the extended portion (center extended portion) 200c at a position corresponding to the protruding portion 31a, towards the groove 60e provided to the upper die 60. When the center extended portion 200c is pushed in the upward direction, the bent portions (center bent portions) 200b that neighbor the center extended portion 200c are tensioned and stretched (Step S25). Because the center bent portions 200b are tensioned along the side edge surfaces 20c of the protruding portion 20a of the upper die 60, the shape of the protruding portion 20a is imparted to the pre-molded article 200.

Next, the tensioning portions 30 sequentially push the pressing jigs 31 towards the pre-molded article 200, starting from the pressing jigs 31 that neighbor the center pressing jig 31 and proceeding towards the pressing jigs 31 positioned at the ends of the upper die 60. The pushed pressing jigs 31 push the extended portions 200c at positions corresponding to the protruding portions 31a towards the grooves 60e of the upper die 60. By pushing of the extended portions 200c, the bent portions 200b that neighbor each of the extended portions 200c are tensioned and stretched (Step S26). At this time, because the bent portions 200b are tensioned along the side edge surfaces 20c of the protruding portions 20a of the upper die 60, the shapes of the protruding portions 20a are imparted to the pre-molded article 200.

Figure 17B:
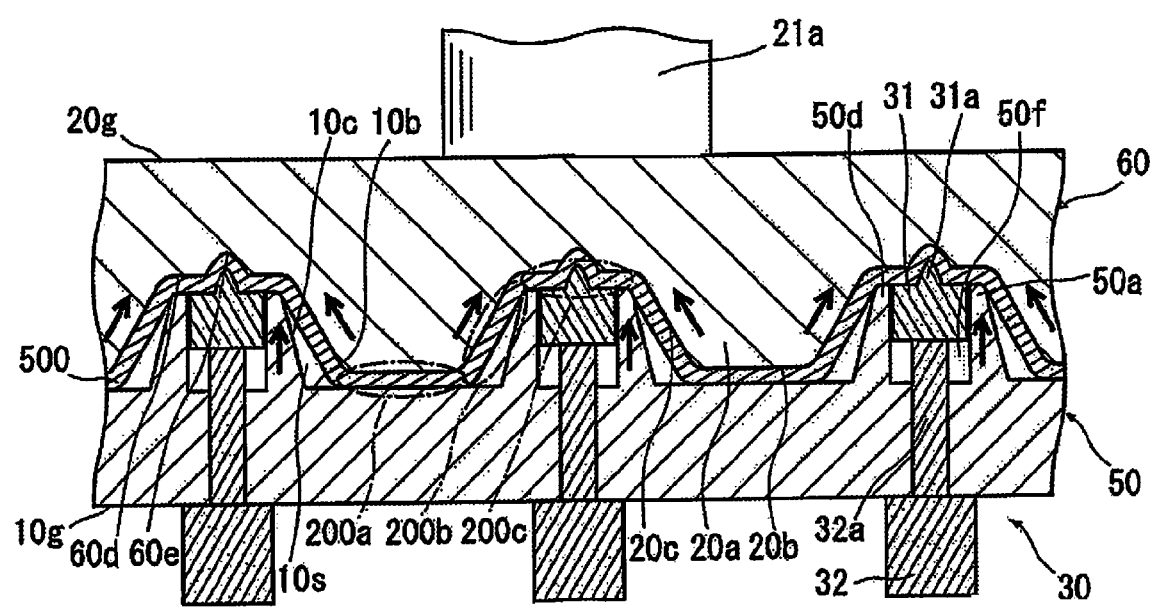
FIG. 17B is a fragmentary cross sectional view showing a state in which all of the tensioning portions are in tension and stretching all of the bent portions.

Next, as shown in FIG. 17B, when the stretching of all of the bent portions 200b through tensioning thereof by the tensioning portions 30 has been completed, the upper die 60 is moved and separated from the lower die 50. By separating the upper die 60 from the lower die 50, the process of molding the molded article 500 from which distortion arising during molding of the thin plate-shaped substrate 100 has been eliminated is completed (Step S27). The molded article 500 for which molding is complete is conveyed out from the molding device 2 (Step S28).

In the thin plate-shaped substrate 100 molding device 2 according to the second embodiment set forth above, the tensioning portions 30 are arranged on the lower die 50 side, for tensioning and stretching the bent portions 200b of the pre-molded article 200. With this configuration, as with that of the molding device 1 of the first embodiment, it is possible to mold the thin plate-shaped substrate 100 with no residual distortion.

Additionally, various modifications of the present invention based on the configuration set forth in the patent claims are possible, and such modifications would fall within the scope of the present invention.

For example, the present embodiment describes a configuration in which the first die is the lower die 10 or 50 on the stationary side, and the second die is the upper die 20 or 60 on the moveable side. However, there is no limitation to this configuration, and a configuration in which, for example, the first die and the second die are arranged laterally would also be acceptable. Also, while the present embodiment describes a configuration in which one die is stationary and the other is moveable, there is no limitation to this configuration, and a configuration in which both dies are capable of moving towards and away from each other would be acceptable as well.

Additionally, the present embodiment describes a configuration in which the molding device 1 (2) molds the pre-molded article 200 to mold a molded article 400 (500) for use as a metal separator. However, there is no limitation to this configuration, and configurations in which molded articles for use in other applications are molded would be acceptable as well.

Further, the present embodiment describes a configuration in which the tensioning portions 30 press the extended portions 200c of the pre-molded article 200 to stretch the bent portions 200b. However, there is no limitation to this configuration, and a configuration in which, for example, a suction pump is installed in place of the pressing jigs 31 and the drive members 32, and the extended portions 200c are suctioned by the suction pump to stretch the bent portions 200b, would be acceptable as well.

Moreover, the present embodiment describes a configuration in which the protruding portions 31a have a single projection. However, there is no limitation to this configuration, and configurations in which the protruding portions 31a have two or more projections would be acceptable as well. In the case of having two or more projections, the distance along the two or more projections, i.e., the distance for which the bent portions 200c may be tensioned, is greater, and therefore the amount of movement of the protruding portions 31a can be shorter than with a configuration having a single projection, and the height dimension of the irregular pattern formed in the extended portions 200c of the pre-molded article 200 through pressing by the protruding portions 31a can be reduced.

The invention claimed is:

1. A thin plate-shaped substrate molding device for pressing molding a pre-molded article obtained by pre-molding a thin plate-shaped substrate to a prescribed irregular shape, the thin plate-shaped substrate molding device comprising:
    a first die and a second die movably disposed so as to be capable of moving towards and away from each other;
    a plurality of protruding portions disposed on the second die to protrude towards the first die, and the plurality of protruding portions being provided with leading edges for forming stretched portions stretched by localized pressing of the pre-molded article, and side edges for inducing deflection in sections that are continuous with the stretched portions, and forming bent portions in spaces bounded on one side by the first die;
    a plurality of tensioning portions for tensioning and stretching the bent portions; and
    a controller for controlling operations of the first die, the second die, and the tensioning portions;
    the bent portions being tensioned and stretched by the tensioning portions while the stretched portions of the pre-molded article are still pressed by the first die and the protruding portions of the second die, to impart the shape of the protruding portions to the pre-molded article along the side edges of the protruding portions, and
    the prescribed irregular shape of the pre-molded article being an irregular shape such that the bent portions will be formed.

2. The thin plate-shaped substrate molding device according to claim 1, wherein
    the plurality of protruding portions are disposed adjacent one another on the second die, and
    the tensioning portions are arranged between the adjacent protruding portions so as to press and move extended portions that extend between adjacent ones of the bent portions, and thereby tension and stretch the respective adjacent ones of the bent portions.

3. The thin plate-shaped substrate molding device according to claim 2, wherein
    the tensioning portions have a protruding portion for pressing the extended portions of the pre-molded article,
    at least one projection being formed on the protruding portion.

4. The thin plate-shaped substrate molding device claim 1, wherein
    the tensioning portions tension and stretch the bent portions in sequential fashion, starting from the flexible portion positioned at a center of the pre-molded article and proceeding towards the bent portions positioned at one of the ends.

5. A thin plate-shaped substrate molding method for molding a thin plate-shaped substrate, in which a pre-molded article obtained by pre-molding a thin plate-shaped substrate to a prescribed irregular shape is press-molded by a first die and a second die disposed so as to be capable of moving towards and away from each other, the thin plate-shaped substrate molding method comprising:
    a deflection forming step for forming stretched portions obtained by causing the pre-molded article to be locally pressed and stretched by the first die and leading edges of protruding portions that are disposed on the second die and that protrude towards the first die, and inducing deflection in sections that are continuous with the stretched portions to form bent portions in spaces formed between the first die and the protruding portions of the second die, and
    a tensioning step for tensioning and stretching the bent portions while the stretched portions of the pre-molded article are still pressed by the first die and the protruding portions of the second die, and imparting a shape of the protruding portions to the pre-molded article along side edges which are continuous with the leading edges of the protruding portions,
    the prescribed irregular shape of the pre-molded article being an irregular shape such that the bent portions will be formed in the deflection forming step.

6. The thin plate-shaped substrate molding method according to claim 5, wherein
    the plurality of protruding portions are disposed adjacent one another on the second die, and
    the tensioning step includes pressing extended portions that extend between the adjacent bent portions are pressed and moved between adjacent ones of the protruding portions, thereby tensioning and stretching the respective adjacent bent portions.

7. The thin plate-shaped substrate molding method according to claim 6, wherein
    the tensioning step includes pressing the extended portions of the pre-molded article using protruding portions; and
    at least one projection being formed on the protruding portions.

8. The thin plate-shaped substrate molding method claim 5, wherein
    the tensioning step includes tensioning and stretching in sequential fashion the bent portions starting from the bent portion positioned at a center of the pre-molded article and proceeding towards the bent portions positioned one of the ends.

9. The thin plate-shaped substrate molding method according to claim 6, wherein
the tensioning step includes tensioning and stretching in sequential fashion the bent portions, starting from the bent portion positioned at a center of the pre-molded article and proceeding towards the bent portions positioned at one of the ends.

10. The thin plate-shaped substrate molding method according to claim 7, wherein
the tensioning step includes tensioning and stretching in sequential fashion the bent portions, starting from the bent portion positioned at a center of the pre-molded article and proceeding towards the bent portions positioned at one of the ends.

11. The thin plate-shaped substrate molding device claim 2, wherein
the tensioning portions tension and stretch the bent portions in sequential fashion, starting from the bent portion positioned at a center of the pre-molded article and proceeding towards the bent portions positioned at one of the ends.

12. The thin plate-shaped substrate molding device claim 3, wherein
the tensioning portions tension and stretch the bent portions in sequential fashion, starting from the bent portion positioned at a center of the pre-molded article and proceeding towards the bent portions positioned at one of the ends.

* * * * *